US010508678B2

(12) United States Patent
Lin

(10) Patent No.: US 10,508,678 B2
(45) Date of Patent: Dec. 17, 2019

(54) METHOD OF FORMING LINKING BLOCK

(71) Applicant: Jui-Kun Lin, Taichung (TW)

(72) Inventor: Jui-Kun Lin, Taichung (TW)

( * ) Notice: Subject to any disclaimer, the term of this patent is extended or adjusted under 35 U.S.C. 154(b) by 142 days.

(21) Appl. No.: 15/609,837

(22) Filed: May 31, 2017

(65) Prior Publication Data

US 2017/0343032 A1   Nov. 30, 2017

(30) Foreign Application Priority Data

May 31, 2016  (TW) .............................. 105117070 A

(51) Int. Cl.
*B21D 53/24* (2006.01)
*F16B 37/02* (2006.01)

(52) U.S. Cl.
CPC .............. *F16B 37/02* (2013.01); *B21D 53/24* (2013.01)

(58) Field of Classification Search
CPC ...... B21D 28/00; B21D 35/001; B21D 53/24; B21K 1/64; B21K 1/66; B21K 1/56
USPC .......................................................... 470/18
See application file for complete search history.

(56) References Cited

U.S. PATENT DOCUMENTS

| 1,990,718 A | * | 2/1935 | Swanstrom | ............ | B21D 53/24 |
| | | | | | 29/417 |
| 3,748,674 A | * | 7/1973 | Powell | .................... | B21D 53/24 |
| | | | | | 470/109 |
| 2003/0015014 A1 | * | 1/2003 | Zmyslowski | ............ | B21K 1/56 |
| | | | | | 72/335 |

* cited by examiner

*Primary Examiner* — Teresa M Ekiert
(74) *Attorney, Agent, or Firm* — Muncy, Geissler, Olds & Lowe, P.C.

(57) ABSTRACT

A linking block includes a top panel, an inner perimeter wall downwardly extended from the middle of the top panel, a bottom panel connected to the bottom edge of the inner perimeter wall, an outer perimeter wall downwardly extended from the outer edge of the top panel and one or multiple holes located in the bottom panel. The invention also provides a method of forming the linking block, which includes a first step of providing a sheet material, a second step of stamping the sheet material into a shape having a top panel, an inner perimeter wall downwardly extended from the middle of the top panel, a bottom panel connected to the bottom edge of the inner perimeter wall and an outer perimeter wall downwardly extended from the outer edge of the top panel, and a third step of creating one or multiple holes in the bottom panel.

2 Claims, 7 Drawing Sheets

METHOD OF FORMING LINKING BLOCK

BACKGROUND OF THE INVENTION

1. Field of the Invention

The present invention relates to linking component parts and more particularly, to a linking block and a method for forming the linking block.

2. Description of the Related Art

A conventional linking block is made of a solid metal block and processed to provide the desired through holes and/or screw holes. Since a solid metal block is used, the finished linking block is thick and heavy, wasting much processing costs.

Therefore, there is room for improvement on the conventional linking block and its forming method.

SUMMARY OF THE INVENTION

The present invention has been accomplished under the circumstances in view. It is the main object of the present invention to provide a linking block and its forming method, which have the advantages of saving material consumption, reducing product weight and facilitating fabrication.

To achieve this and other objects of the present invention, a linking block comprises a top panel, an inner perimeter wall downwardly extended from the middle part of the top panel, a bottom panel connected to the bottom edge of the inner perimeter wall, an outer perimeter wall downwardly extended from the outer edge of the top panel, and at least one hole located in the bottom panel.

Thus, the linking block made in accordance with the present invention has a hollow structure, saving material consumption and reducing the weight.

Preferably, the linking block further comprises a protruding barrel formed on the bottom panel and protruding upward or downward relative to the bottom panel.

Preferably, the linking block further comprises an inner thread formed in one hole.

To achieve this and other objects of the present invention, a method of forming the linking block includes a first step of providing a sheet material, a second step of stamping the sheet material into a predetermined shape having a top panel, an inner perimeter wall downwardly extended from the middle part of the top panel, a bottom panel connected to the bottom edge of the inner perimeter wall and an outer perimeter wall downwardly extended from the outer edge of the top panel, and a third step of creating one or multiple holes in the bottom panel.

Thus, the method of the present invention facilitates quick fabrication.

Preferably, the method further comprises a sub step of stamping the bottom panel to create a protruding barrel around one hole. Further, the protruding barrel protrudes upward or downward relative to the bottom panel.

Preferably, the method further comprises a sub step of creating an inner thread in the protruding barrel and the respective hole within the protruding barrel.

Preferably, the method further comprises a sub step of stamping a lower part of the outer perimeter wall into a rim, allowing the rim to be removed from the outer perimeter wall during the step of creating the at least one hole in the bottom panel.

Preferably, the step of employing a stamping technique to create at least one hole in the bottom panel is to create three holes in the bottom panel in a row with one hole disposed in the center and the other two holes disposed at two opposite lateral sides.

Other advantages and features of the present invention will be fully understood by reference to the following specification in conjunction with the accompanying drawings, in which like reference signs denote like components of structure.

DETAILED DESCRIPTION OF THE INVENTION

Figure 1:
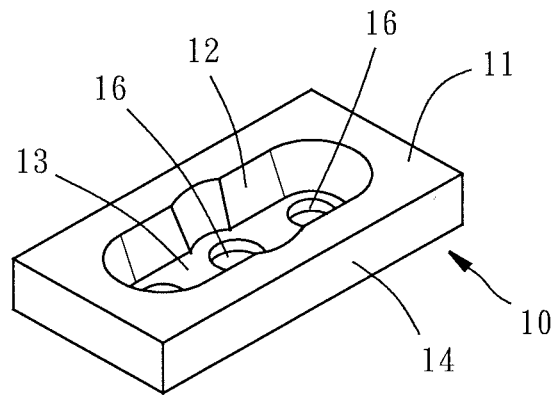
FIG. 1 is an oblique top elevational view of a linking block in accordance with the present invention.

The applicant first describes here that the adjectives relating to the directionality of inner, outer, top and bottom referred to in the specification are based on the direction in the drawings of the present invention.

Figure 2:
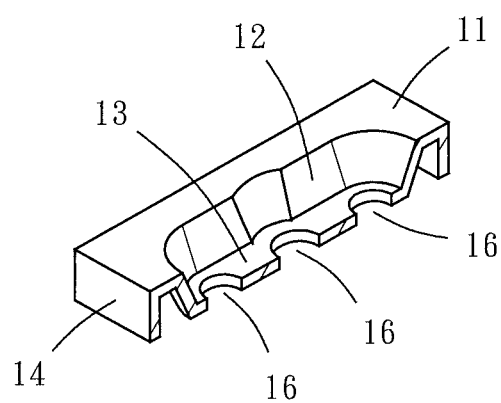
FIG. 2 is a sectional elevation of the linking block shown in FIG. 1.

Referring to FIGS. 1 and 2, a linking block 10 in accordance with the present invention is shown. The linking block 10 comprises:

a top panel 11;

an inner perimeter wall 12 downwardly extended from a middle part of the top panel 11;

a bottom panel 13 connected to a bottom edge of the inner perimeter wall 12;

an outer perimeter wall 14 downwardly extended from an outer edge of the top panel 11; and three holes 16 located in the bottom panel 13.

With the above structure, the invention achieves the objects of saving material consumption and maintaining high structural strength.

The embodiment described above is not a limitation. Broadly defined, the linking block 10 is configured to provide at least one hole 16.

Figure 3:
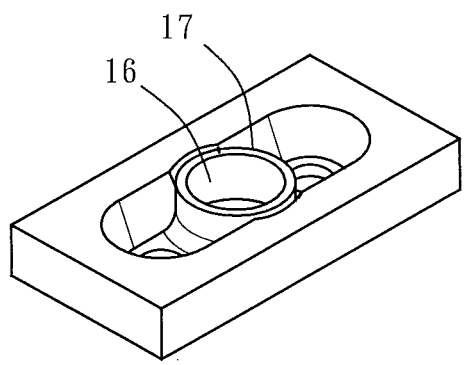
FIG. 3 is an oblique top elevational view of an alternate form of the linking block in accordance with the present invention.
Figure 4:
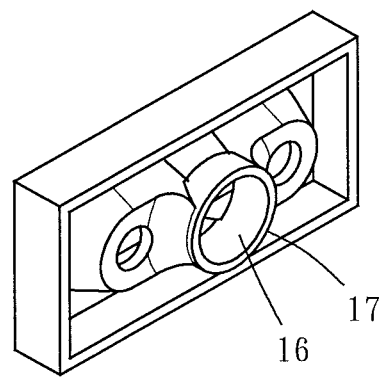
FIG. 4 is similar to FIG. 3, illustrating the extending direction of the protruding barrel reversed.

In another embodiment of the present invention as shown in FIG. 3 and FIG. 4, the linking block 10 further comprises a protruding barrel 17 located on the bottom panel 13 with a hole 16 defined therein. Further, the protruding barrel 17 can be configured to protrude upward or downward relative to the bottom panel 13.

This alternate form achieves the same effect of saving material consumption and maintaining high structural strength.

Figure 5:
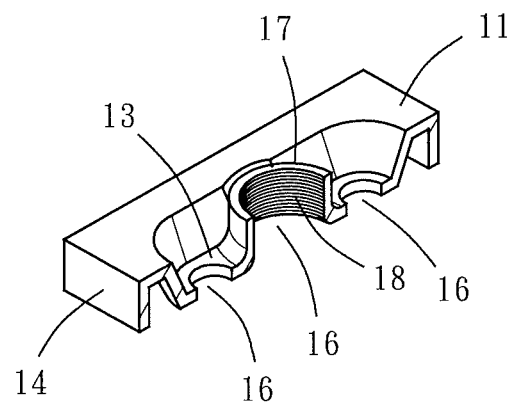
FIG. 5 corresponds to FIG. 3, illustrating an inner thread created in the protruding barrel.
Figure 6:
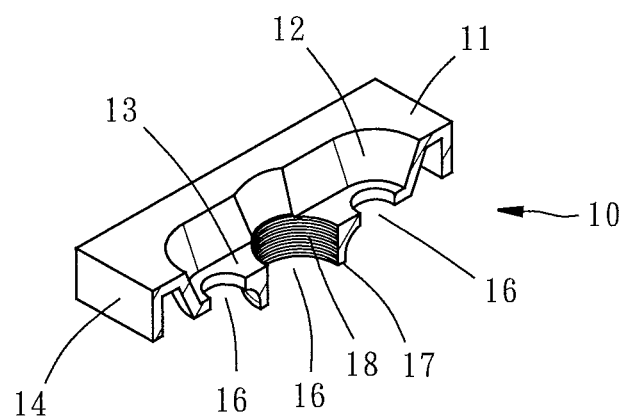
FIG. 6 corresponds to FIG. 4, illustrating an inner thread created in the protruding barrel.
Figure 7:
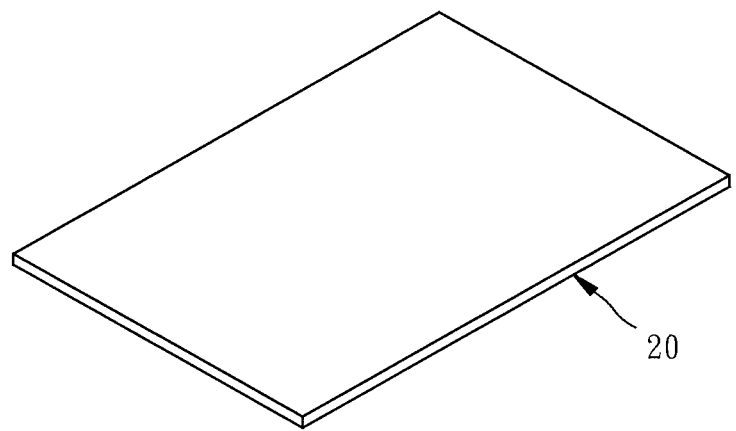
FIG. 7 illustrates a sheet material prepared in a linking block forming method in accordance with the present invention.
Figure 8:
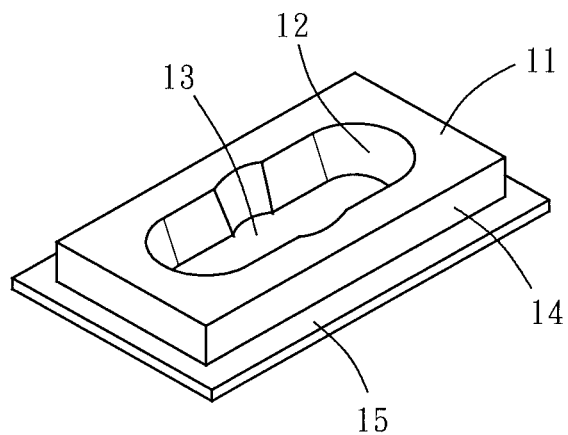
FIG. 8 illustrates the sheet material stamped in the linking block forming method in accordance with the present invention (I).
Figure 9:
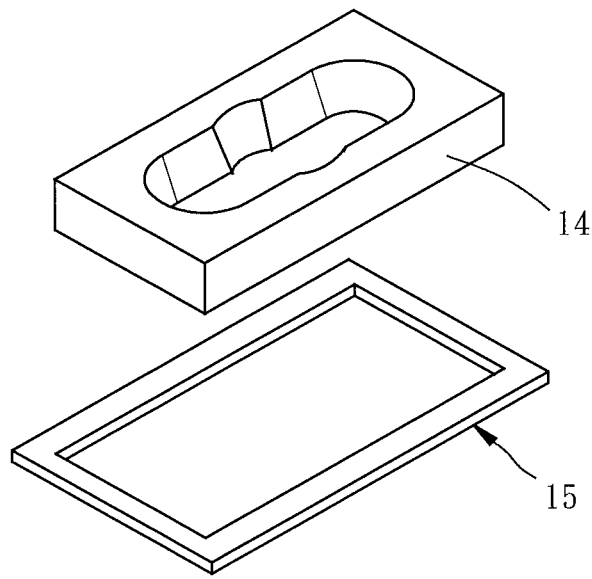
FIG. 9 illustrates the sheet material stamped in the linking block forming method in accordance with the present invention (II).
Figure 10:
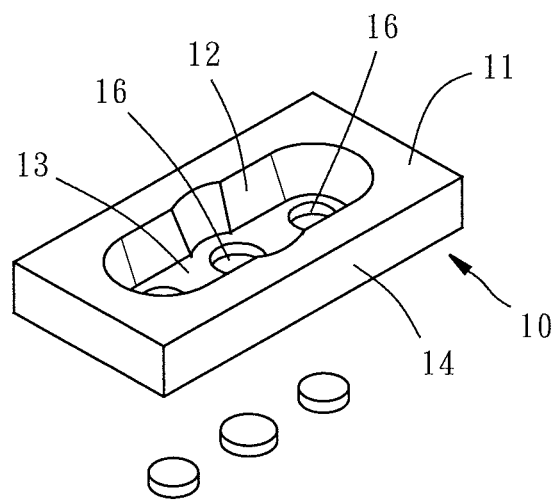
FIG. 10 illustrates the sheet material stamped in the linking block forming method in accordance with the present invention (III).
Figure 11:
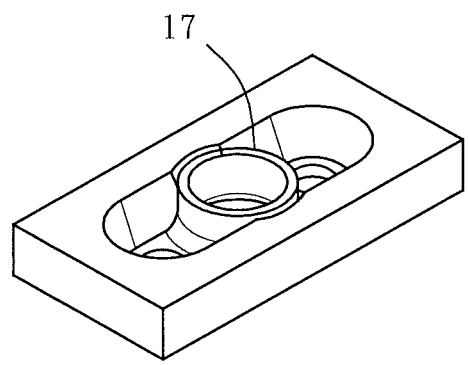
FIG. 11 illustrates the sheet material stamped in the linking block forming method in accordance with the present invention (IV).
Figure 12:
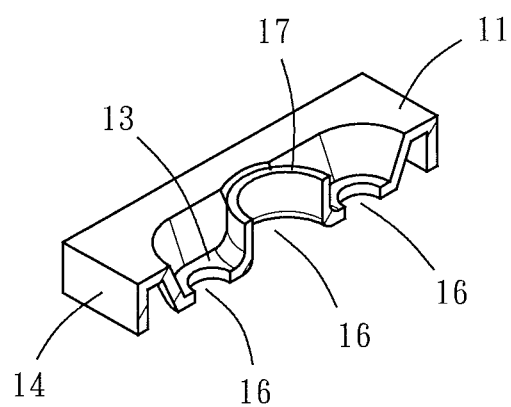
FIG. 12 is a sectional elevation of FIG. 11.
Figure 13:
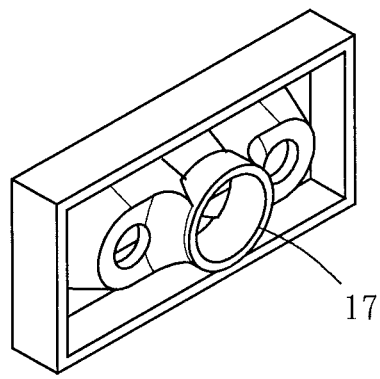
FIG. 13 is similar to FIG. 11, illustrating the protruding direction of the protruding barrel reversed.
Figure 14:
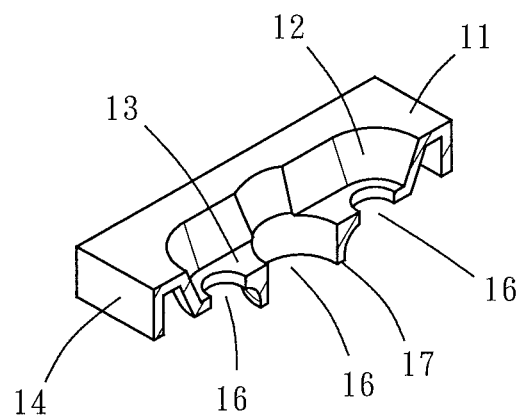
FIG. 14 is a sectional elevation of FIG. 13.

In still another embodiment of the present invention as shown in FIG. 5 and FIG. 6, the linking block 10 comprises three holes 16, a protruding barrel 17 located on the bottom panel 13 with one of the three holes 16 defined therein, and an inner thread 18 formed in the hole 16 within the protruding barrel 17.

This embodiment also achieves the same effect of saving material consumption and maintaining high structural strength.

Referring to FIGS. 7-10, the method of forming a linking block 10 in accordance with one embodiment of the present invention comprises the steps of:

providing a sheet material 20;

stamping said sheet material 20 into a predetermined shape comprising a top panel 11 having an outer edge, an inner perimeter wall 12 having a bottom edge and downwardly extended from a middle part of the top panel 11, a bottom panel 13 connected to the bottom edge of the inner perimeter wall 12 and an outer perimeter wall 14 downwardly extended from the outer edge of the top panel 11;

stamping a lower part of the outer perimeter wall 14 into a rim 15; and employing a stamping technique to create at least one, for example, three holes 16 in the bottom panel 13 and to simultaneously remove the rim 15 from the outer perimeter wall 14 so as to obtain the desired finished linking block 10.

With the above stamping techniques, the invention can save time and effort more than other conventional manufacturing methods, achieving the expected objects.

Referring to FIGS. 11-14, in an another embodiment of the present invention, the method further comprises a sub step of stamping the bottom panel 13 to create a protruding barrel 17 around the hole 16 in the center.

With the above stamping techniques, the invention can save time and effort more than other conventional manufacturing methods, achieving the expected objects.

In still another embodiment of the present invention, the method further comprises a sub step of creating an inner thread 18 in the protruding barrel 17 and the respective hole 16 in the center.

With the above stamping and thread-making techniques, the invention can save time and effort more than other conventional manufacturing methods, achieving the expected objects.

It is to be understood that the method of the invention can be variously embodied, and modifications can be made without departing from the spirit and scope of the invention.

For example, it is not imperative to stamp the lower part of the outer perimeter wall into the rim 15. In the case that the rim 15 is created, it is not imperative to remove the rim 15 from the outer perimeter wall 14.

Further, the inner perimeter wall 12 and the outer perimeter wall 14 can be separately made using stamping techniques.

In summary, the linking block 10 and the method of forming the linking block 10 in accordance with the present invention have the advantages of saving material consumption, reducing product weight and facilitating fabrication.

What is claimed is:

1. A method of forming a linking block, comprising the steps of:
    (i) providing a sheet material;
    (ii) stamping said sheet material into a predetermined shape comprising a top panel having an outer edge, an inner perimeter wall having a bottom edge and downwardly extended from a middle part of said top panel, a bottom panel connected to the bottom edge of said inner perimeter wall and an outer perimeter wall downwardly extended from the outer edge of said top panel; and
    (iii) stamping said bottom panel to create three holes in said bottom panel in a row with one said hole disposed in the center and the other two said holes disposed at two opposite lateral sides;
    (iv) stamping said bottom panel to form a protruding barrel around one said hole disposed in the center, and
    (v) creating an inner thread in said protruding barrel and the respective said hole within said protruding barrel.

2. The method as claimed in claim 1, further comprising stamping a lower part of said outer perimeter wall into a rim in step (ii), allowing said rim to be removed from said outer perimeter wall during stamping said bottom panel to create three said holes in said bottom panel.

\* \* \* \* \*